(12) United States Patent
Raible et al.

(10) Patent No.: US 9,011,217 B2
(45) Date of Patent: Apr. 21, 2015

(54) AIR GUIDE ELEMENT AND AIR GUIDE ELEMENT ARRANGEMENT FOR AN AIRCRAFT AIR CONDITIONING SYSTEM

(75) Inventors: Thorsten Raible, Hamburg (DE); Ingo Gores, Hamburg (DE); Andreas Edom, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1333 days.

(21) Appl. No.: 12/603,951

(22) Filed: Oct. 22, 2009

(65) Prior Publication Data
US 2010/0099347 A1    Apr. 22, 2010

Related U.S. Application Data

(60) Provisional application No. 61/107,441, filed on Oct. 22, 2008.

(30) Foreign Application Priority Data

Oct. 22, 2008   (DE) .......................... 10 2008 052 792

(51) Int. Cl.
*B64D 13/00* (2006.01)
*F24F 13/06* (2006.01)
*F24F 13/08* (2006.01)
*B64D 13/06* (2006.01)

(52) U.S. Cl.
CPC ................ *F24F 13/06* (2013.01); *B64D 13/00* (2013.01); *B64D 2013/0625* (2013.01); *F24F 13/081* (2013.01)

(58) Field of Classification Search
USPC ............................................ 454/71, 76, 152
See application file for complete search history.

(56) References Cited

U.S. PATENT DOCUMENTS

| | | | | | |
|---|---|---|---|---|---|
| 3,229,609 | A | * | 1/1966 | Larson et al. | 454/190 |
| 3,363,532 | A | * | 1/1968 | Horneff | 454/187 |
| 3,492,934 | A | * | 2/1970 | Steigerwald | 454/233 |
| 3,673,945 | A | * | 7/1972 | Rachlin et al. | 454/298 |

(Continued)

FOREIGN PATENT DOCUMENTS

| | | |
|---|---|---|
| DE | 884 688 B | 7/1953 |
| DE | 1 778 833 B | 10/1971 |

(Continued)

*Primary Examiner* — Steven B McAllister
*Assistant Examiner* — Jonathan Cotov
(74) *Attorney, Agent, or Firm* — Kreig DeVault LLP

(57) ABSTRACT

An air guide element (10) for an aircraft air conditioning system comprises a housing (12), which has an air inlet opening (14) and an air outlet opening (16). The air inlet opening (14) and the air outlet opening (16) are disposed in such a way and the housing (12) is shaped in such a way that air that is fed to the air guide element (10) through the air inlet opening (14), as it flows through the air guide element (10), is deflected at an angle of ca. 45° to 135° relative to the direction of the air flow through the air inlet opening (14). A cross-sectional area of flow of the housing (12) that is disposed at right angles to the direction of the air flow through the air outlet opening (16) is subdivided into at least two regions (18a, 18b, 18c). In each of said regions (18a, 18b, 18c) an easily accessible, removable and exchangeable calibrating element (20a, 20b, 20c) is disposed, which is designed to generate, in the air flow passing through a region (18a, 18b, 18c) that is associated with a respective calibrating element (20a, 20b, 20c), a pressure loss that is constant over said region (18a, 1b, 18c).

17 Claims, 5 Drawing Sheets

(56) References Cited

U.S. PATENT DOCUMENTS

Figure 1:
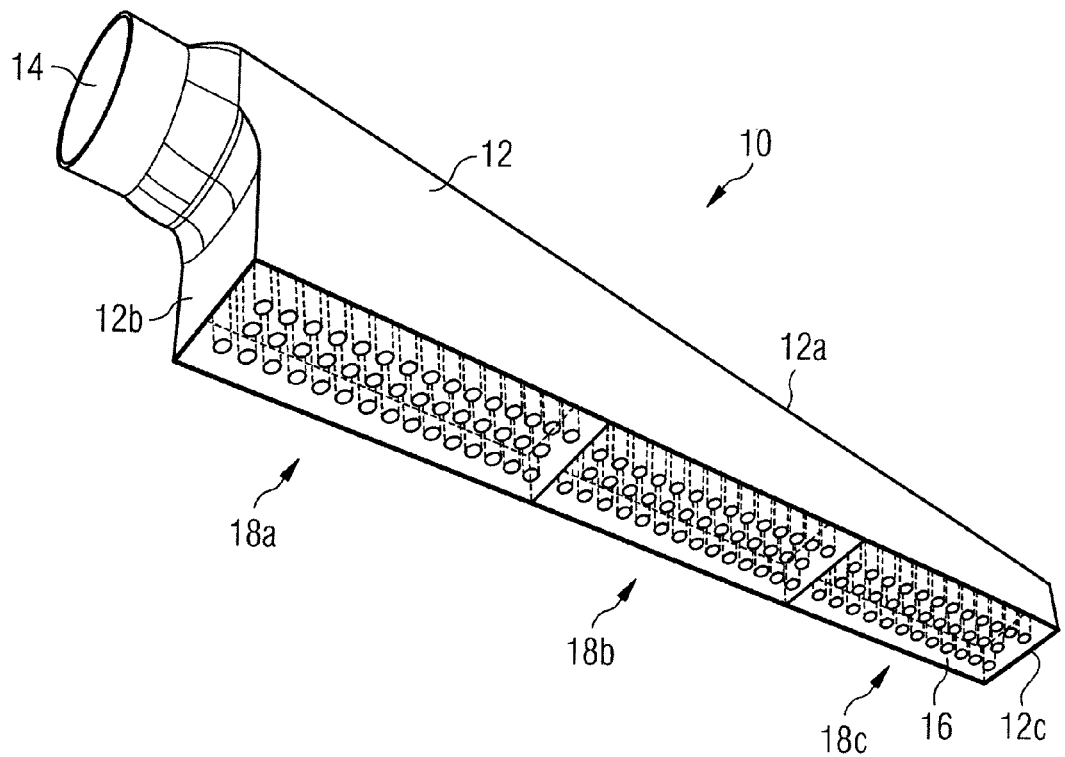

| | | | |
|---|---|---|---|
| 3,918,354 A * | 11/1975 | Lambert | 454/304 |
| 4,517,813 A * | 5/1985 | Eggebrecht et al. | 62/284 |
| 4,811,575 A * | 3/1989 | Currier et al. | 454/333 |
| 4,819,548 A * | 4/1989 | Horstman | 454/76 |
| 5,562,263 A * | 10/1996 | Wagner | 244/118.5 |
| 5,695,396 A * | 12/1997 | Markwart et al. | 454/76 |
| 5,746,653 A * | 5/1998 | Palmer et al. | 454/186 |
| 5,830,058 A * | 11/1998 | Røsjø | 454/187 |
| 6,817,941 B1 * | 11/2004 | Gatov | 454/187 |
| 7,497,772 B2 * | 3/2009 | Laib | 454/333 |
| 8,118,648 B2 * | 2/2012 | Bruggen et al. | 454/76 |
| 8,342,921 B2 * | 1/2013 | Huber et al. | 454/76 |
| 2002/0160706 A1 * | 10/2002 | Elliot et al. | 454/121 |
| 2005/0230488 A1 * | 10/2005 | Markwart et al. | 237/10 |
| 2008/0086981 A1 * | 4/2008 | Kilkis et al. | 52/791.1 |
| 2008/0142636 A1 * | 6/2008 | Castro | 244/118.5 |
| 2009/0239463 A1 * | 9/2009 | Goenka | 454/331 |
| 2009/0275277 A1 * | 11/2009 | Al-Alusi et al. | 454/76 |
| 2010/0192616 A1 * | 8/2010 | Gores et al. | 62/408 |
| 2011/0294409 A1 * | 12/2011 | Edom et al. | 454/76 |
| 2013/0118493 A1 * | 5/2013 | Umlauft et al. | 128/204.18 |

FOREIGN PATENT DOCUMENTS

| | | | |
|---|---|---|---|
| DE | 199 24 030 C1 | | 1/2001 |
| DE | 10 2006 005 543 A1 | | 8/2007 |
| WO | WO 89/03961 | | 5/1989 |
| WO | 2006041418 | * | 4/2006 |
| WO | WO 2007/090608 A1 | | 8/2007 |

* cited by examiner

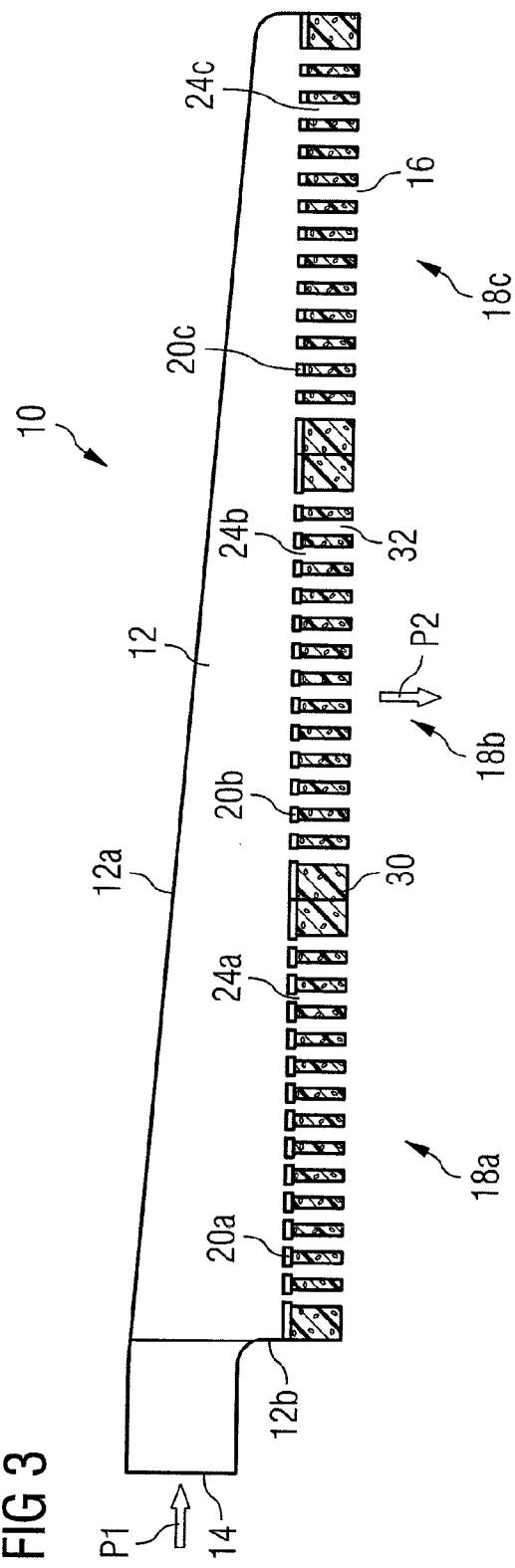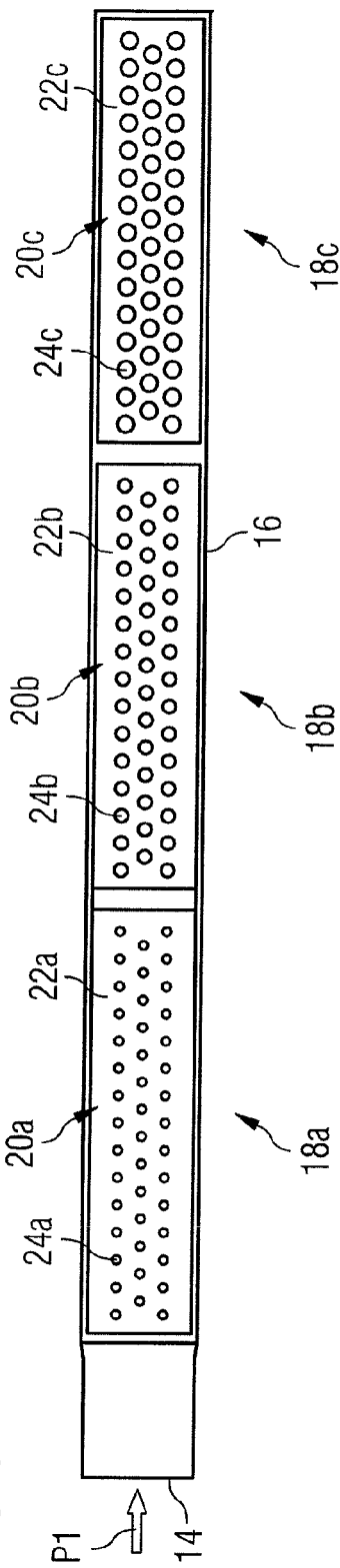

AIR GUIDE ELEMENT AND AIR GUIDE ELEMENT ARRANGEMENT FOR AN AIRCRAFT AIR CONDITIONING SYSTEM

CROSS REFERENCE TO RELATED APPLICATIONS

The present application claims priority to German Patent Application No. 10 2008 052 792.0, filed Oct. 22, 2008 and claims the benefit of U.S. Provisional Patent Application No. 61/107,441, filed Oct. 22, 2008, each of which is incorporated herein by reference.

The invention relates to an air guide element for an aircraft air conditioning system that is used for example to direct conditioned air provided by the aircraft air conditioning system into a passenger cabin of the aircraft. The invention further relates to an air guide element arrangement as well as to an aircraft air conditioning system equipped with an air guide element according to the invention or with an air guide element arrangement according to the invention.

An aircraft air conditioning system comprises a plurality of air guide elements, to which air flowing through a line system of the aircraft air conditioning system is supplied through an air inlet opening and which are used to direct the conditioned air supplied by the aircraft air conditioning system into the passenger cabin of the aircraft. The design of an air guide element depends upon various criteria, for example the direction of flow of the air into the air guide element, the direction of flow of the air out of the air guide element, the intended use of the air guide element and the place of installation of the air guide element in the aircraft. The design of an air guide element, i.e. not only its external shape but also the configuration of its functionally important components therefore conventionally has to be adapted very precisely to the demands placed on the air guide element in a specific application situation. For this reason, the air guide elements installed in an aircraft or range of aircraft often differ considerably from one another. The design adaptations that are to be carried out on the various air guide elements of an aircraft air conditioning system may however not only be very laborious and cost-intensive but also lead to losses of performance.

The present invention is directed to the object of providing an air guide element that is suitable for use in an aircraft air conditioning system and enables easy adaptation of its design and physical flow behaviour to application-specific requirements.

In order to achieve this object, an air guide element according to the invention for an aircraft air conditioning system comprises a housing, which has an air inlet opening and an air outlet opening. The air inlet opening and the air outlet opening are disposed in such a way and the housing is shaped in such a way that air fed to the air guide element through the air inlet opening, as it flows through the air guide element, is deflected at an angle of ca. 45° to 135° relative to the direction of the air flow through the air inlet opening. The air guide element may also be designed in such a way that the air fed through the air inlet opening into the air guide element is deflected at an angle of ca. 55° to 125°, 65° to 115°, 75° to 105° or 85° to 95° relative to the air flow through the air inlet opening. In a particularly preferred embodiment of the air guide element according to the invention, the air guide element is however designed in such a way that the air, as it flows through the air guide element, experiences a deflection at an angle of ca. 90° relative to the direction of the air flow through the air inlet opening. An air guide element that is suitable for deflecting an air flow fed to the air guide element at ca. 90° as it flows through the air guide element comprises for example an air inlet opening disposed in a first lateral surface of the housing as well as an air outlet opening formed in a second lateral surface of the housing, wherein the second lateral surface extends substantially at right angles to the first lateral surface.

A cross-sectional area of flow of the housing of the air guide element according to the invention that is disposed at right angles to the direction of the air flow through the air outlet opening is subdivided into at least two regions. Where desired or required, the cross-sectional area of flow of the housing disposed at right angles to the direction of the air flow through the air outlet opening may however alternatively also be subdivided into three or more regions of equal or differing length. In each of the regions of the cross-sectional area of flow an easily accessible, removable and exchangeable calibrating element is disposed, which is designed to generate, in the air flow passing through a region of the cross-sectional area of flow of the housing associated with a respective calibrating element, a pressure loss that is constant over said region. In other words, each calibrating element ensures that in the air flow passing through the region of the cross-sectional area of flow, in which the calibrating element is disposed, a pressure loss arises, which is constant over the region of the cross-sectional area of flow, through which flow occurs. The aim here is to achieve as homogeneous as possible a distribution of speed and volumetric flow in longitudinal direction of the discharge side.

By virtue of subdividing the cross-sectional area of flow of the housing of the air guide element according to the invention into a plurality of regions and by virtue of controlling the flow through said regions by means of suitable calibrating elements, the air guide element according to the invention may be adapted in a particularly simple manner to application-specific demands placed on the flow control properties of the air guide element. A variation of the flow control properties of the air guide element by exchanging the calibrating elements is possible even in the installed state of the air guide element in an aircraft cabin.

Ideally the regions, into which the cross-sectional area of flow of the housing disposed at right angles to the direction of the air flow through the air outlet opening is subdivided, are of equal size. This enables an optimum exchangeability of the calibrating elements. Because it is possible to dispense with additional internal flow control elements, further advantages of the air guide element according to the invention are the low number of individual parts and the resulting low material- and manufacturing costs. The air guide element according to the invention is moreover notable for its low weight, which is particularly advantageous in aircraft construction.

The calibrating elements installed in the air guide element according to the invention are preferably designed in the form of aperture plates. The aperture plates may be made of a plastics material, of a glass-fibre-reinforced plastics material or of a hybrid material and may be disposed in such a way in the housing that they are easily accessible, removable from the housing and exchangeable. Particularly easy manufacture of the calibrating elements is possible, if the calibrating elements take the form of plastic injection-moulded components. In the calibrating elements a plurality of throughflow apertures is preferably formed. Preferably in a calibrating element throughflow apertures with an identical cross section of flow are formed. The cross section of flow of the throughflow apertures is preferably so selected for each calibrating element that, in the air flow passing through a region of the cross-sectional area of flow of the housing associated with a respective calibrating element, a pressure loss that is constant over said region is generated. In other words, by virtue of controlling the cross section of flow of the throughflow apertures formed in a calibrating element the pressure loss in the air flow through the region of the cross-sectional area of flow of the housing, in which the calibrating element is disposed, is adjusted in a desired manner and hence the volumetric flow is controlled as a target variable. The smaller the cross section of flow of the throughflow apertures is selected, the greater the back draught effected in the air flow by the calibrating element and hence the pressure loss generated in the air flow and the lower the volumetric flow.

The calibrating elements are preferably provided with the identical number of throughflow apertures. Furthermore, the centres of the throughflow apertures in the calibrating elements may be positioned identically in the various calibrating elements. In other words, even if the throughflow apertures formed in various calibrating elements have differing cross sections of flow, the calibrating elements preferably have an identical number of throughflow apertures, the centres of which are moreover situated at the same positions of the calibrating elements. If a plurality of calibrating elements were to be placed one on top of the other, it would thereby be possible to bring the throughflow apertures formed in the calibrating elements into coincidence with one another. By virtue of this design of the calibrating elements different calibrating elements, i.e. calibrating elements having throughflow apertures of differing cross sections of flow, may be combined in a particularly straightforward manner with further components of the air guide element, for example with a sound-absorbing device that is described in more detail below.

In a preferred embodiment of the air guide element according to the invention, a first region of the cross-sectional area of the housing is disposed, in relation to the direction of the air flow through the air inlet opening, upstream of a second region of the cross-sectional area of flow of the housing. A first calibrating element disposed in the first region is preferably provided with throughflow apertures that have a larger cross section of flow than throughflow apertures formed in a calibrating element disposed in the second region. If the cross-sectional area of flow of the housing is subdivided into more than two regions, the cross section of flow of the throughflow apertures formed in the calibrating elements is preferably all the smaller, the further downstream the regions and hence the calibrating elements associated with said regions are disposed in relation to the direction of the air flow through the inlet opening. A calibrating element that is disposed further downstream in relation to the direction of the air flow through the air inlet opening is therefore capable of generating a higher pressure loss over the region associated with the calibrating element than a calibrating element disposed further upstream in relation to the direction of the air flow through the air inlet opening. Such a design of the calibrating elements used in the air guide element according to the invention enables an optimized uniform distribution of flow, i.e. an optimized distribution of the air quantity and the air speed through the air outlet opening. In principle, however, an oppositely directed arrangement of the throughflow apertures of the calibrating elements is equally possible, i.e. the cross section of flow of the throughflow apertures formed in the calibrating elements may be all the greater, the further downstream the regions and hence the calibrating elements associated with said regions are disposed in relation to the direction of the air flow through the air inlet opening.

The throughflow apertures formed in the calibrating elements may be arranged in an isodistant pattern. Preferably, the throughflow apertures are arranged in at least two rows, wherein the spacings between the throughflow apertures arranged in a row are equal to the spacings between the throughflow apertures of a row and the throughflow apertures of an adjacent row. Throughflow apertures that are arranged in an isodistant pattern enable an optimum distribution of the air flow through the air outlet opening. However, if this is desired or necessary for a specific application, the throughflow apertures formed in the calibrating elements may alternatively be arranged in any desired other pattern. Furthermore, individual throughflow apertures formed in the calibrating elements may be closed. For example, individual throughflow apertures may be closed after conducting appropriate tests in order to adapt the flow control properties of the air guide element in dependence upon the test results.

The calibrating elements may be connected in a fixed manner to the housing of the air guide element. For example, the calibrating elements may be glued to the housing or laminated onto the housing. For example, the housing may have an inwardly or outwardly projecting flange, to which the calibrating elements may be connected. A fixed connection of the calibrating elements to the housing of the air guide element is always reasonable, if it can not be expected that the flow control properties of the air guide element are to be varied by means of an exchange of the calibrating elements and/or if manufacture of the air guide element with calibrating elements, connected in a fixed manner to the housing is easier or more economical. The housing of the air guide element may be made of any suitable material. For example, the housing may be manufactured from a glass-fibre-reinforced plastics material or a hybrid material. A calibrating element connected in a fixed manner to the housing is preferably made from the same material as the housing, i.e. for example from a glass-fibre-reinforced plastics material or from a hybrid material.

As an alternative to this, however, at least one insertion device for receiving a calibrating element may be formed in the housing of the air guide element according to the invention. The insertion device may be used to detachably connect the calibrating element to the housing of the air guide element. The calibrating element may then, if need be, be exchanged particularly easily. The insertion device may for example have dimensions that enable the calibrating element to be supported in a stable manner. It is self-evident that there may also be formed in the housing a number of insertion devices that corresponds to the number of calibrating elements to be used in the air guide element. Where this is desired or necessary, some calibrating elements of an air guide element may however also be connected in a fixed manner to the housing of the air guide elements and other calibrating elements may be accommodated detachably in corresponding insertion devices. Calibrating elements that are detachably connectable to the housing of the air guide element are preferably made of a plastics material and may be manufactured as injection-moulded parts.

Preferably, the air guide element according to the invention further comprises a fastening device for fastening the calibrating element in the insertion device. The fastening device may be designed for example in the form of a self-locking mechanism. For example, a detent device may be provided, which holds the calibrating element securely in its position in the insertion device. During transport or installation of the air guide element for example, the fastening device prevents the calibrating element from falling out of the insertion device formed in the housing of the air guide element.

In previously known air guide elements there is the further problem that only noise arising in the air supply pipes connected to the air guide elements is eliminated by sound-absorbing tubes. Noise that arises as the air stream exits from the air guide elements, for example as a result of deflection of the air stream or as a result of flow separations caused for example by sudden changes of the cross section of flow, on the other hand enters the aircraft cabin in an undamped state. In order to combat this problem and to dampen the noise that arises when an air stream exits from the air guide element according to the invention, the air guide element preferably further comprises a sound-absorbing device. The sound-absorbing device may be disposed, in relation to the direction of the air flow through the air outlet opening, downstream of the calibrating elements. Side walls of the air guide element housing may be designed in such a way that they surround the sound-absorbing device. The sound-absorbing device is then particularly well protected from damage. In a particularly lightweight embodiment of the air guide element according to the invention, the sound-absorbing device is however no longer accommodated in the housing, but extends from the air outlet opening of the housing in the direction of the air flow through the air outlet opening.

The sound-absorbing device may be made of a sound-absorbing foam material that enables effective sound absorption. As a sound-absorbing foam material a material of as high a rigidity as possible and with as low an erosion rate as possible may be used, for example a polyimide foam or a melamine foam, such as for example a Basotec™ foam. The sound-absorbing device made of for example a sound-absorbing foam material may be fastened to the housing of the air guide element according to the invention. It is however alternatively also possible to fasten the sound-absorbing device to the calibrating elements. For example, the sound-absorbing device may be glued onto the calibrating elements. The sound-absorbing device may be of an integral construction and extend over the entire air outlet opening. Alternatively, it is however also conceivable to use a multi-part sound-absorbing device, in which the individual parts of the sound-absorbing device may be associated with the regions of the cross-sectional area of flow of the housing and/or with the calibrating elements.

In order to guarantee an unimpeded flow through the sound-absorbing device, the sound-absorbing device is preferably provided with throughflow apertures. The throughflow apertures formed in the sound-absorbing device are preferably arranged congruently with the throughflow apertures formed in the calibrating elements. In other words, the sound-absorbing device is disposed in such a way relative to the calibrating elements that the centres of the throughflow apertures formed in the calibrating elements are disposed at the same positions as the centres of the throughflow apertures formed in the sound-absorbing device. Thus, by means of the throughflow apertures provided in the calibrating elements and in the sound-absorbing device air, guide channels are formed, through which an unimpeded flow is possible.

In order to simplify the manufacture of the sound-absorbing device and achieve as homogeneous as possible a distribution of speed and volume in longitudinal direction of the air outlet opening, the throughflow apertures formed in the sound-absorbing device preferably have identical cross sections of flow. In other words, if an air guide element comprises calibrating elements having throughflow apertures of differing cross sections of flow, the cross section of flow of the throughflow apertures formed in the sound-absorbing device is preferably adapted to the largest diameter of the throughflow apertures formed in the calibrating elements. In principle, the diameter of the sound-absorbing bore may also be larger than the largest diameter of the calibrating elements, but not smaller. Preferably, the ratio of the thickness of the sound-absorbing device, i.e. the extent of the sound-absorbing device in the direction of the air flow through the air outlet opening, to the diameter of throughflow apertures that are formed in the sound-absorbing device and have a circular cross section of flow is ≥2.

The shape of the housing of the air guide element according to the invention may be adapted in an application-specific manner, i.e. in dependence upon the desired flow control properties of the air guide element and in dependence upon any existing installation space restrictions. For example, the housing may be of a substantially cuboidal shape. It is however alternatively also possible for the housing to have a cross section that tapers in the direction of the air flow through the air inlet opening. In a housing designed in this manner, a side wall of the housing that lies opposite the air outlet opening may for example be inclined at an angle relative to the adjacent side walls of the housing.

An air guide element arrangement according to the invention comprises a first and a second air guide element, at least one of which is designed in the manner described above. Where desired or necessary, the air guide element arrangement according to the invention may however alternatively also comprise more than two air guide elements. In the air guide element arrangement according to the invention the air inlet openings of the air guide elements each are connected to air feed channels, wherein an air feed channel connected to the air inlet opening of the first air guide element extends substantially parallel to the housing of the second air guide element. In the air guide element arrangement according to the invention a plurality of air guide elements are therefore extended in a modular manner into an air guide element chain.

The air feed channels of the air guide element arrangement according to the invention may be formed by hollow-cylindrically-shaped components having a suitable cross section of flow or by profile elements that are open at one side, wherein the profile elements that are open at one side are sealingly connected to an adjacent housing of an air guide element or to an adjacent air feed channel in order to form tight air feed channels. An optimum utilization of installation space is possible, if the air feed channels have a substantially rectangular cross section, which may however be provided with rounded corners.

The air feed channels of the air guide element arrangement according to the invention may have a cross section of flow that increases in the direction of the air flow through the air feed channels. As a result of the increasing cross section of flow the flow speed of the air, as it flows through the air feed channels, is reduced so that the air enters at a desired reduced speed into the air inlet openings of the air guide elements.

The air guide element according to the invention and the air guide element arrangement according to the invention are particulary suitable for use in an aircraft air conditioning system. An aircraft air conditioning system according to the invention therefore comprises a previously described air guide element and/or a previously described air guide element arrangement.

Figure 2:
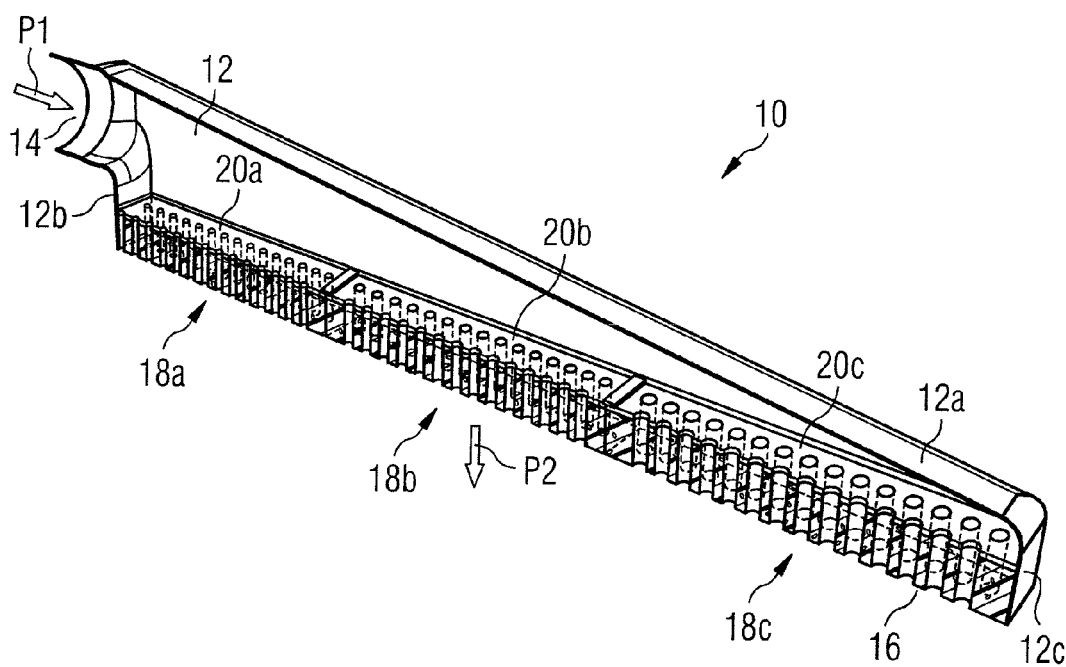
Figure 5:
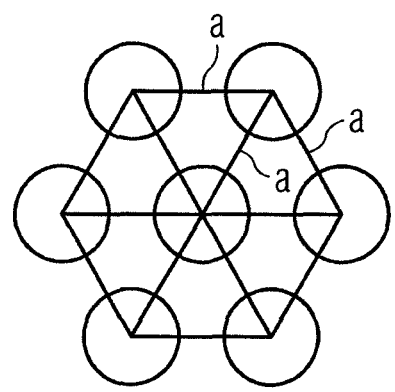
Figure 6:
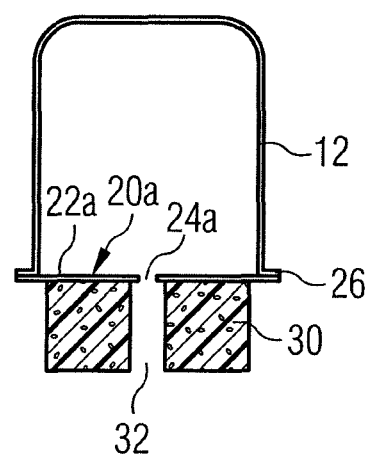
Figure 7:
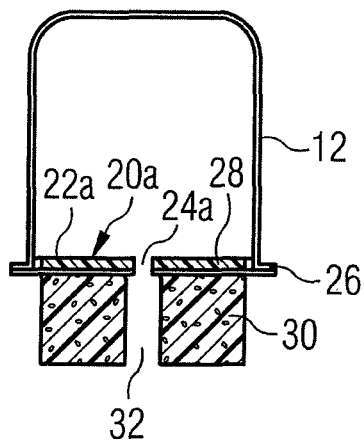
Figure 8:
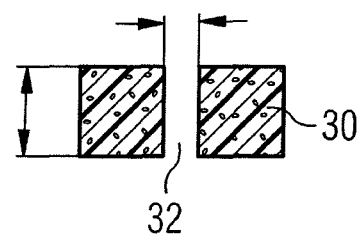
Figure 9:
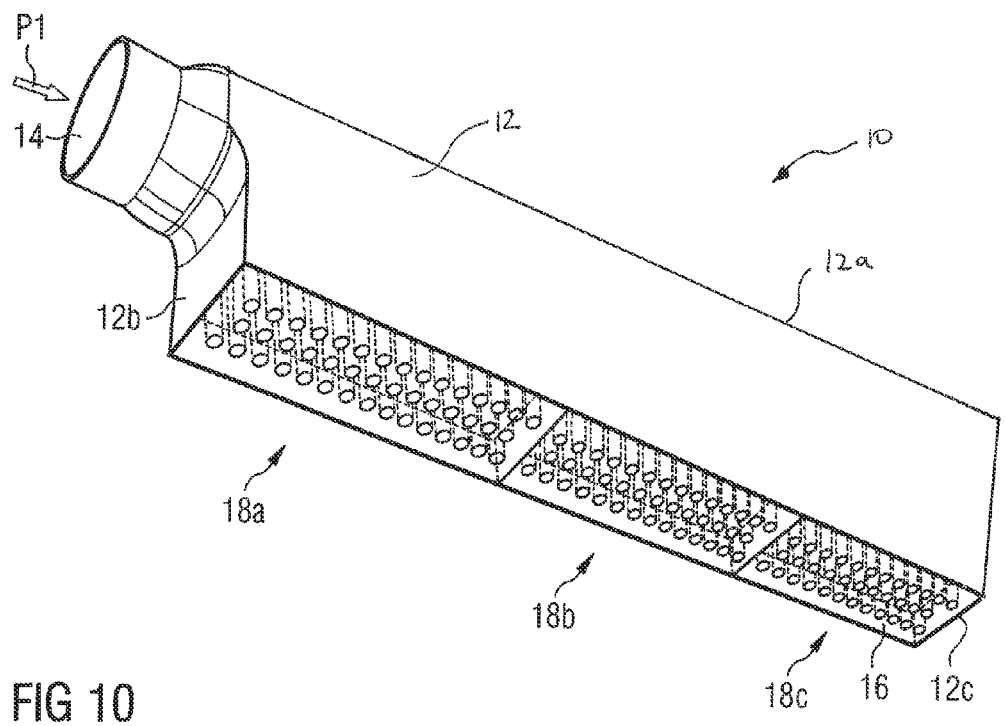
Figure 10:
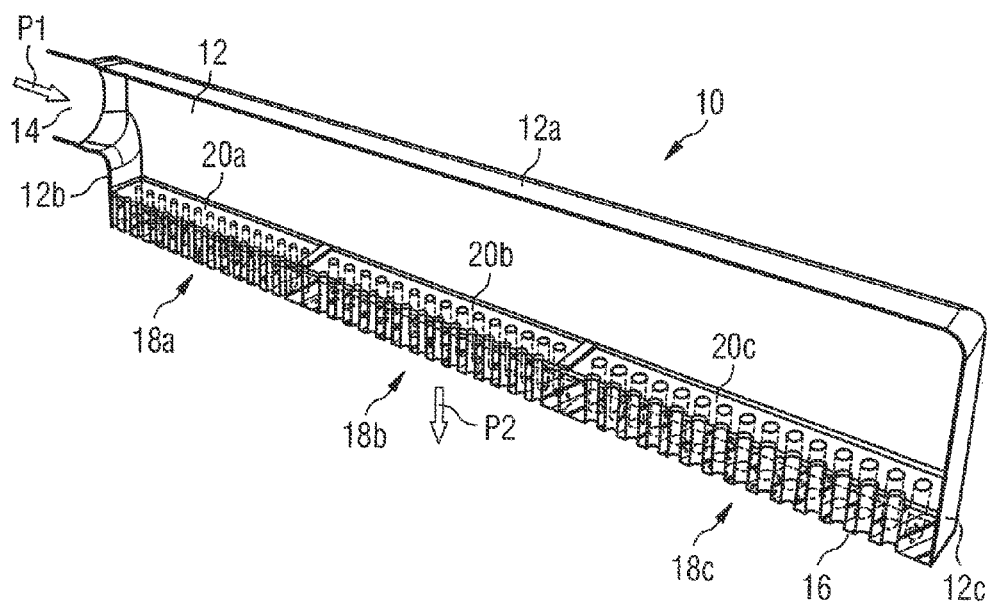
Figure 11:
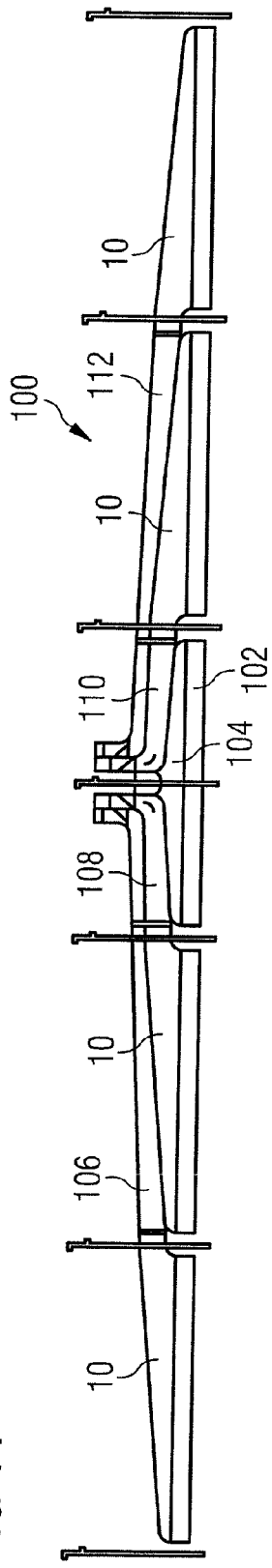
Figure 12:
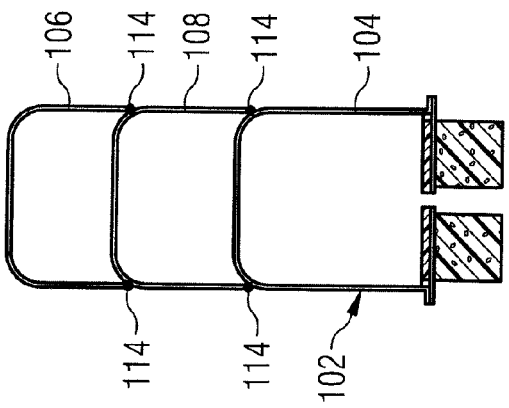
Figure 13:
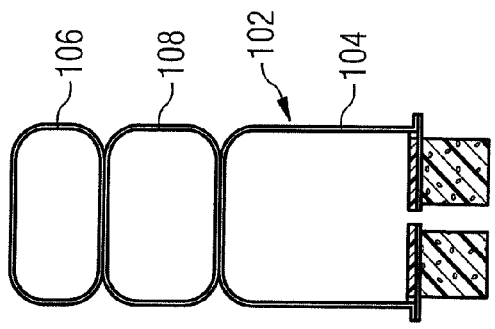

There now follows a detailed description of preferred embodiments of the invention with reference to the accompanying diagrammatic drawings, which show:

FIG. 1 a three-dimensional view of a first embodiment of an air guide element for an aircraft air conditioning system, FIG. 2 a three-dimensional sectional view of the air guide element according to FIG. 1, FIG. 3 a longitudinal sectional view of the air guide element according to FIG. 1, FIG. 4 a plan view of the air outlet opening of the air guide element according to FIG. 1, FIG. 5 a detail representation of a pattern, in which throughflow apertures formed in calibrating elements of the air guide element according to FIG. 1 are arranged, FIG. 6 a cross-sectional view of the air guide element according to FIG. 1 with calibrating elements connected in a fixed manner to an air guide element housing, FIG. 7 a cross-sectional view of the air guide element according to FIG. 1 with calibrating elements connected detachably to an air guide element housing, FIG. 8 a cross-sectional view of a sound-absorbing device used in the air guide element according to FIG. 1, FIG. 9 a three-dimensional view of a second embodiment of an air guide element for an aircraft air conditioning system, FIG. 10 a three-dimensional sectional view of the air guide element according to FIG. 9, FIG. 11 an air guide element arrangement comprising a plurality of air guide elements, FIG. 12 a cross-sectional view of the air guide element arrangement according to FIG. 11, in which air feed channels are formed by hollow-cylindrically-shaped components, and FIG. 13 a cross-sectional view of the air guide element arrangement according to FIG. 11, in which air feed channels are formed by profile elements that are open at one side.

FIGS. 1 and 2 show an air guide element 10 that is provided for use in an aircraft air conditioning system. The air guide element 10 comprises a housing 12, which has an air inlet opening 14 and an air outlet opening 16. Through the air inlet opening air is fed to the air guide element 10 in a direction indicated by the arrow P1. By virtue of the shape of the housing 12 and the arrangement of the air inlet opening 14 and air outlet opening 16, the air after entering the air inlet opening 14, while flowing through the air guide element 10 is deflected at ca. 90°, so that the air exits from the air guide element 10 through the air outlet opening 16 in a direction indicated by the arrow P2.

As may best be seen in FIGS. 2 to 4, a cross-sectional area of flow of the housing 12 that is disposed at right angles to the direction of the air flow through the air outlet opening 16 is subdivided into three regions 18a, 18b, 18c of equal size. In each of the regions 18a, 18b, 18c a calibrating element 20a, 20b, 20c is disposed. The calibrating element 20a is designed to generate, in an air flow passing through the region 18a of the cross-sectional area of flow of the housing 12, a pressure loss that is constant over the region 18a. In a similar manner, the calibrating element 20b is designed to generate, in an air flow passing through the region 18b of the cross-sectional area of flow of the housing 12, a pressure loss that is constant over the region 18b. Finally, the calibrating element 18c is also designed to generate, in an air flow passing through the region 18c of the cross-sectional area of flow of the housing 12, a pressure loss that is constant over the region 18c.

The calibrating elements 20a, 20b, 20c each are designed in the form of aperture plates, which comprise a base plate 22a, 22b, 22c having throughflow apertures 24a, 24b, 24c formed therein. The throughflow apertures 24a formed in the calibrating element 20a have a circular cross section of flow of identical diameters, wherein the diameter of the throughflow apertures 24a is so selected that in the air flow passing through the region 18a of the cross-sectional area of flow of the housing 12 a constant pressure loss is generated over the region 18a. In a similar manner, the throughflow apertures 24b formed in the calibrating element 20b each are provided with a circular cross section of flow of identical diameters, wherein the diameter of the throughflow apertures 24b is so selected that in the air flow passing through the region 18b of the cross-sectional area of flow of the housing 12 a pressure loss that is constant over the region 18b is generated. Equally, the flow apertures 24c formed in the calibrating element 20c each are provided with a circular cross section of flow of identical diameters, wherein the diameter of the throughflow aperture 24c is so selected that in the air flow passing through the region 18c of the cross-sectional area of flow of the housing 12 a pressure loss that is constant over the region 18c is generated.

The calibrating elements 20a, 20b, 20c each are provided with the same number of throughflow apertures 24a, 24b, 24c, wherein the centres of the throughflow apertures 24a, 24b, 24c each are positioned identically in the calibrating elements 20a, 20b, 20c. In other words, if the calibrating elements 20a, 20b, 20c were to be laid one on top of the other, the centres of the throughflow apertures 24a, 24b, 24c formed in the calibrating elements 20a, 20b, 20c could be brought into coincidence with one another.

As may be seen in FIG. 4, the throughflow apertures 24a, 24b, 24c are arranged in the calibrating elements 20a, 20b, 20c in three rows. The spacing "a" of two adjacent throughflow apertures 24a, 24b, 24c in a row is identical to the spacing "a" of two adjacent throughflow apertures 24a, 24b, 24c in two mutually adjacent rows. In other words, the throughflow apertures 24a, 24b, 24c formed in the calibrating elements 20a, 20b, 20c are arranged in an isodistant pattern, which is represented once more in detail in FIG. 5.

The region 18a of the cross-sectional area of flow of the housing 12 is disposed, in relation to the direction of the air flow through the air inlet opening 14, upstream of the region 18b of the cross-sectional area of flow of the housing 12. In a similar manner, the region 18b of the cross-sectional area of flow of the housing 12 is disposed, in relation to the direction of the air flow through the air inlet opening 14, upstream of the region 18c of the cross-sectional area of flow of the housing 12. The calibrating element 20a disposed in the region 18a is provided with throughflow apertures 24a that have a larger diameter than the throughflow apertures 24b formed in the calibrating element 20b. In a similar manner, the diameter of the throughflow apertures 24b formed in the calibrating element 20b is larger than the diameter of the throughflow apertures 24c formed in the calibrating element 20c. In other words, the further downstream a calibrating element 20a, 20b, 20b is disposed in relation to the direction of the air flow through the air inlet opening 14, the smaller the diameter of the throughflow apertures 24a, 24b, 24c formed in the calibrating element 20a, 20b, 20c. By virtue of this design of the calibrating elements 20a, 20b, 20c an optimum uniform distribution of the air flow, i.e. of the air quantity and of the air speed through the air outlet opening 16, is achieved.

The housing 12 of the air guide element 10 may be made of a glass-fibre-reinforced plastics material or of a hybrid material. The calibrating elements 20a, 20b, 20c may, as is shown in FIG. 6, be connected in a fixed manner to the housing 12 of the air guide element 10. In the arrangement illustrated in FIG. 6, the calibrating elements 20a, 20b, 20c are laminated onto an outwardly projecting flange 26 that is formed on the housing 12. The calibrating elements 20a, 20b, 20c connected in a fixed manner to the housing 12 may be made of a glass-fibre-reinforced plastics material or of a hybrid material. An optimum connection between the housing 12 and the calibrating elements 20a, 20b, 20c may be achieved if the housing 12 and the calibrating elements 20a, 20b, 20c are made of the same material.

Alternatively, as is shown in FIG. 7, the housing 12 of the air guide element 10 may be provided with three insertion devices 28, each of which is designed to receive one of the calibrating elements 20a, 20b, 20c. The calibrating elements 20a, 20b, 20c may then, if need be, be exchanged particularly easily. A calibrating element 20a, 20b, 20c accommodated exchangeably in an insertion device 28 is preferably manufactured economically as a plastic injection-moulded part. In order to prevent the calibrating elements 20a, 20b, 20c from falling out of the insertion elements 28, a fastening device that is not shown in detail in FIG. 7 is provided, which holds the calibrating elements 20a, 20b, 20c in the respective insertion devices 28.

The air guide element 10 further comprises a sound-absorbing device 30, which is made of a sound-absorbing foam material of a high rigidity and with a low erosion rate, for example a polyimide foam or a melamine foam, such as for example a Basotec™ foam. The sound-absorbing device 30 is disposed, in relation to the direction of the air flow through the air outlet opening 16, downstream of the calibrating elements 20a, 20b, 20c. As may be seen particularly in FIG. 3, the sound-absorbing device 30 comprises three parts, wherein each part is associated with one of the regions 18a, 18b, 18c of the cross-sectional area of flow of the housing 12. It is however alternatively also possible for the sound-absorbing device 30 to be of an integral construction.

In the sound-absorbing device 30 throughflow apertures 32 are formed, which allow an unimpeded flow through the sound-absorbing device 30. The diameter of the throughflow apertures 32 formed in the sound-absorbing device 30 is identical to the largest diameter of throughflow apertures 24a, 24b, 24c formed in a calibrating element 20a, 20b, 20c. In other words, in the embodiment shown in the figures the diameter of the throughflow apertures 32 formed in the sound-absorbing device 30 corresponds to the diameter of the throughflow apertures 24a formed in the calibrating element 20a. As is illustrated in FIG. 8, the ratio of the thickness of the sound-absorbing device 30, i.e. the extent of the sound-absorbing device 30 in the direction of the air flow through the air outlet opening 16, to the diameter of the throughflow apertures 32 formed in the sound-absorbing device 30 is ≥2.

As is illustrated in FIGS. 1 and 2, the housing 12 of the air guide element 10 has a cross section that tapers in the direction of the air flow through the air inlet opening 14, i.e. a lateral surface 12a of the housing 12 is disposed inclined at an angle relative to adjacent lateral surfaces 12b, 12c. In contrast thereto, the housing 12 of an air guide element 10 shown in FIGS. 9 and 10 has a substantially cuboidal shape, i.e. a lateral surface 12a of the housing 12 is disposed substantially at right angles to adjacent lateral surfaces 12b, 12c. Otherwise, the construction of the air guide element 10 shown in FIGS. 9 and 10 corresponds to the construction of the air guide element described above and shown in FIGS. 1 to 4, 6 and 7.

FIG. 11 finally shows an air guide element arrangement 100, which comprises four air guide elements 10, as shown in FIGS. 1 to 4, 6 and 7, as well as a central air guide element 102 having a housing 104. The air inlet openings 14 of the air guide elements 10 each are connected to air feed channels 106, 108, 110, 112. The air feed channels 106, 108, 110, 112 each extend substantially parallel to the housing 12, 104 of an air guide element 10, 102 that is disposed adjacent to the air guide element 10, 102, to the air inlet opening 114 of which the air feed channel 106, 108, 110, 112 is connected. The air feed channels 106, 108, 110, 112 have a cross section of flow that increases in the direction of the air flow through the air feed channels 106, 108, 110, 112, so that the flow speed of the air, as it flows through the air feed channels 106, 108, 110, 112, is reduced. This guarantees that the air enters the air inlet openings 14 of the air guide elements 10 at the desired reduced speed.

As may be seen in FIG. 12, the air feed channels 106, 108, 110, 112 may be formed by hollow-cylindrically-shaped components. It is however alternatively also possible, as shown in FIG. 13, to use profile elements that are open at one side to form the air feed channels 106, 108, 110, 112. In this case, all that is necessary is the provision of suitable seals 114 which enable a sealing connection of an air feed channel 106, 108, 110, 112 to an adjacent air feed channel 106, 108, 110, 112 or to an adjacent housing 12, 104 of an air guide element 10, 102. An optimum utilization of installation space is achieved by designing the air feed channels 106, 108, 110, 112 with substantially rectangular cross sections of flow, wherein the cross sections of flow are provided with rounded corners.

The invention claimed is:

1. Air guide element for an aircraft air conditioning system, having a housing, which has an air inlet opening and an air outlet opening, wherein the air inlet opening and the air outlet opening are disposed in such a way and the housing is shaped in such a way that air, which is fed to the air guide element through the air inlet opening, as it flows through the air guide element, is deflected at an angle of about 45° to 135° relative to the direction of the air flow through the air inlet opening, characterized in that a cross-sectional area of flow of the housing that is disposed at right angles to the direction of the air flow through the air outlet opening is subdivided into at least two regions, and that in each of said regions an easily accessible, removable and exchangeable calibrating element is disposed, which is designed to generate, in the air flow passing through a region of the cross-sectional area of flow of the housing that is associated with a respective calibrating element, a pressure loss that is constant over said region, characterized in that the calibrating elements are designed in the form of aperture plates that have a plurality of throughflow apertures, wherein the cross section of flow of the throughflow apertures is in each case so selected that in the air flow passing through a region of the cross-sectional area of flow of the housing that is associated with a respective calibrating element a pressure loss that is constant over said region is generated.

2. Air guide element according to claim 1, characterized in that the calibrating elements are provided in each case with the same number of throughflow apertures and that the centres of the throughflow apertures are positioned in each case identically in the calibrating elements.

3. Air guide element according to claim 1, characterized in that a first region of the cross-sectional area of flow of the housing-is disposed, in relation to the direction of the air flow through the air inlet opening, upstream of a second region of the cross-sectional area of flow of the housing, and that a first calibrating element disposed in the first region is provided with throughflow apertures that have a larger cross section of flow than throughflow apertures that are formed in a calibrating element disposed in the second region.

4. Air guide element according to claim 1, characterized in that the throughflow apertures formed in the calibrating elements-are arranged in an isodistant pattern, and/or that individual throughflow apertures-formed in the calibrating elements are closed.

5. Air guide element according to claim 1, characterized in that at least one insertion device for receiving a calibrating element is formed in the housing.

6. Air guide element according to claim 5, characterized by a fastening device for fastening the calibrating element in the insertion device.

7. Air guide element according to claim 1,
characterized by a sound-absorbing device that is disposed, in relation to the direction of the air flow through the air outlet opening, downstream of the calibrating elements.

8. Air guide element according to claim 7,
characterized in that the sound-absorbing device is provided with throughflow apertures that are disposed congruently with throughflow apertures formed in the calibrating elements.

9. Air guide element according to claim 8,
characterized in that the cross section of flow of the throughflow apertures formed in the sound-absorbing device is identical to the largest cross section of flow of throughflow apertures formed in a calibrating element.

10. Air guide element according to claim 1,
characterized in that the housing is of a substantially cuboidal shape or has a cross section that tapers in the direction of the air flow through the air inlet opening.

11. Air guide element arrangement for an aircraft air conditioning system having a first and a second air guide element, at least one of which is an air guide element according to claim 1, wherein the air inlet openings of the air guide elements each are connected to air feed channels, and wherein an air feed channel connected to the air inlet opening of the first air guide element extends substantially parallel to a housing of the second air guide element.

12. Air guide element arrangement according to claim 11,
characterized in that the air feed channels are formed by hollow-cylindrically-shaped components having a suitable cross section of flow or by profile elements that are open at one side, wherein the profile elements that are open at one side are connected sealingly to an adjacent housing of an air guide element or to an adjacent air feed channel in order to form tight air feed channels.

13. Air guide element arrangement according to claim 11,
characterized in that the air feed channels have a cross section of flow that increases in the direction of the air flow through the air feed channels.

14. Air guide element according to claim 2,
characterized in that a first region of the cross-sectional area of flow of the housing is disposed, in relation to the direction of the air flow through the air inlet opening, upstream of a second region of the cross-sectional area of flow of the housing, and that a first calibrating element disposed in the first region is provided with throughflow apertures that have a larger cross section of flow than throughflow apertures that are formed in a calibrating element-disposed in the second region.

15. Air guide element arrangement according to claim 12,
characterized in that the air feed channels have a cross-section of flow that increases in the direction of the airflow through the air feed channels.

16. Air guide element arrangement according to claim 3,
characterized in that the first calibrating element disposed in the first region is separate and apart from the calibrating element disposed in the second region.

17. Air guide element arrangement according to claim 16,
characterized in that the first calibrating element includes apertures having identical first sizes, the calibrating element disposed in the second region includes apertures having identical second sizes, and that the size of the apertures in the first calibrating element and the calibrating element in the second region dictates the pressure loss across each of the respective regions.

* * * * *